United States Patent

[11] 3,577,870

| [72] | Inventor | Cornelis Van Der Lely<br>7 Bruschenrain, Zug, Switzerland |
|---|---|---|
| [21] | Appl. No. | 668,308 |
| [22] | Filed | Sept. 14, 1967 |
| [45] | Patented | May 11, 1971 |
| [32] | Priority | Sept. 29, 1966 |
| [33] | | Netherlands |
| [31] | | 6613708 |

[54] MOWING MACHINES
31 Claims, 2 Drawing Figs.

[52] U.S. Cl. .................................................. 56/6, 56/25.4
[51] Int. Cl. ...................................................... A01d 75/30
[50] Field of Search ................................................ 56/7; 56/25, 25.4, 5, 6, 255, 295

[56] References Cited
UNITED STATES PATENTS

| 1,183,880 | 5/1916 | Johnston ...................... | 56/6X |
| 2,753,674 | 7/1956 | Cunningham et al. ......... | 56/6 |
| 2,770,085 | 11/1956 | Laughlin ....................... | 56/25.4 |
| 3,127,940 | 4/1964 | Hutchinson et al. .......... | 56/25X |
| 2,636,333 | 4/1953 | Michaels ...................... | 56/255 |
| 2,953,888 | 9/1960 | Phillips, Jr. et al. ........... | 56/255X |
| 3,157,014 | 11/1964 | Bottenberg ................... | 56/6 |
| 3,382,653 | 5/1968 | De Buigne .................... | 56/295X |
| 3,391,522 | 7/1968 | Zweegers ..................... | 56/6 |

FOREIGN PATENTS

| 1,471,960 | 1/1967 | France ......................... | 56/25.4 |
| 183,472 | 4/1963 | Sweden ....................... | 56/255 |

*Primary Examiner*—Louis G. Mancene
*Assistant Examiner*—J. A. Oliff
*Attorney*—Mason, Mason & Albright ABSTRACT: A mowing machine for attachment laterally of a tractor wherein at the side of the mowing elements, viewed in the direction of travel approximately at the same level as the front side of the mowing elements, the mowing machine is supported from the ground so that, in operation, the mowing machine is pivotally connected with the tractor by means of a pivotal shaft extending approximately at right angles to the direction of travel. The mowing machine is pivotally connected to a lateral portion of the shaft for pivotal movement about an axis extending generally in the direction of travel.

INVENTOR
CORNELIS VAN DER LELY
BY
Mason, Mason & Albright
Attorneys

MOWING MACHINES

This invention relates to mowing machines, such machines being of the kind comprising a frame which is movable over the ground, said machine comprising a plurality of adjacent mowing elements adapted to rotate about corresponding substantially vertical axes.

Figure 1:
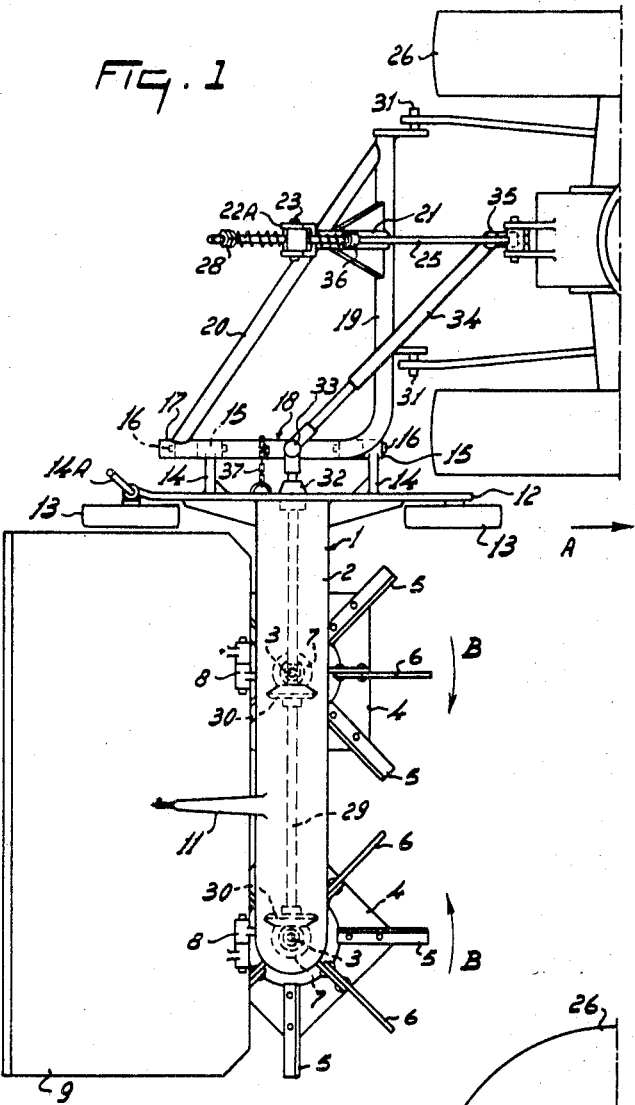
Figure 2:
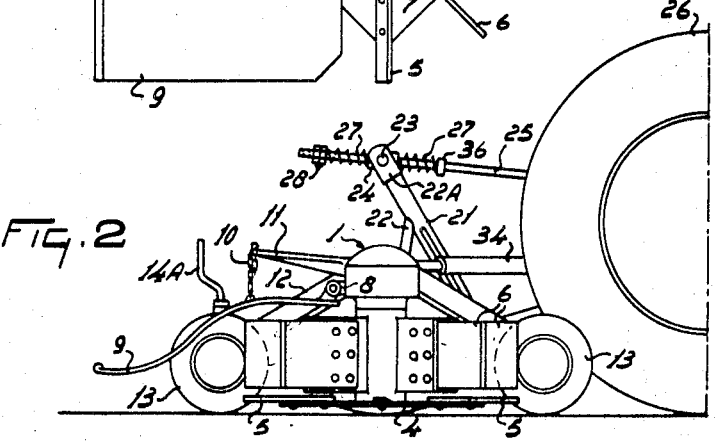

For a better understanding of the invention, and to show how the same may be carried into effect, reference will now be made, by way of example, to the accompanying drawings, in which:

FIG. 1 is a plan view of a mowing machine in accordance with the invention coupled to the rear of an agricultural tractor, and FIG. 2 is a side elevation corresponding to FIG. 1.

Referring to the drawings, the mowing machine which is illustrated has a frame 1 which includes a main frame beam 2 that extends horizontally and substantially perpendicularly transverse to the intended direction of travel of the machine which is indicated by the arrow A in FIG. 1 of the drawings. Two substantially vertical shafts 3 are rotatably journaled in the main frame beam 2, each shaft 3 being associated with corresponding mowing elements. Each shaft 3 has a corresponding horizontally disposed square disc 4 mounted at its foot and four cutting members in the form of blades 5 are secured to each disc 4 so as to extend radially of the corresponding shaft 3 in line with one of the four corners of that disc. Each shaft 3 has four vertically disposed and radially extending flaps 6 secured to it, each flap 6 being arranged (in plan view) midway between a neighboring pair of the blades 5 and each flap 6 being formed from a flexible material such as rubber, plastic or canvas. As can be seen in the drawings, the upper edge of each flap 6 is located a very short distance beneath the main frame beam 2 while the lower edge thereof is located a very short distance above the corresponding disc 4. The radial extent of the flaps 6 from the shafts 3 is substantially the same as that of the blades 5. The upper end of each shaft 3, located within the hollow main frame beam 2, carries a corresponding bevel pinion 7. As seen in FIG. 2, the blades 5 are rectangular and located in a plane passing through the bottoms of the mowing elements. The discs 4 are substantially flat at their outer peripheries with spherical downward projections at their centers. The diameters of the extensions are about one third the diameters of the circles traced by blades 5.

Two hinges 8 are provided at the rear side of the main frame beam 2 relative to the direction A and afford a substantially horizontal axis about which a screening baffle 9 for cut crop can be turned upwardly and downwardly to some extent. It will be apparent from the drawings that the screening baffle 9 is of profiled platelike construction and that, relative to the direction A, said baffle 9 has a leading substantially horizontally disposed portion, a rearwardly merging downwardly directed curved portion, a rearwardly merging upwardly curved portion and a rearmost substantially horizontal portion terminating in a beaded rear edge. A lug or like anchorage is provided approximately centrally of the upper surface of the baffle 9 and a chain 10 extends between this lug or other anchorage and the rearmost end of an arm 11 which projects rearwardly, relative to the direction A, from the main frame beam 2 above the screening baffle 9.

The left-hand end of the main frame beam 2, when the machine is viewed from the rear in the direction A, is provided with two arms 12 that extend forwardly and downwardly and rearwardly and downwardly therefrom respectively. The lowermost end of each arm 12 rotatably supports a corresponding ground wheel 13. The distance between the points of support or ground contact of wheels 13 is greater than half the length of frame beam 2 and at least equal to the distance between vertical shafts 3. The mounting of the rearmost of the two ground wheels 13, relative to the direction A, incorporates mechanism 14A (which may be of known construction) for raising and lowering the level of the axis of rotation of that ground wheel 13 relative to the end of the arm 12 to which the wheel is rotatably connected. The sides of the two arms 12 which are remote from the main frame beam 2 carry corresponding projecting supports 14 that extend parallel to the main frame beam 2. The ends of the two supports 14 that are remote from the arms 12 carry substantially horizontal bearings 15 that are turnable about aligned hinge pins 16 extending substantially parallel to the direction A and substantially perpendicular to the main frame beam 2. The hinge pins 16 are carried by a portion 17 of a beam 18, said portion 17 extending parallel to the direction A and being integrally connected by a 90° bend to a further portion 19 that extends substantially perpendicular to the direction A. The whole of the beam 18 is contained in an approximately horizontal plane. A straight beam 20 interconnects the relatively remote ends of the two portions 17 and 19 of the beam 18 so that, in plan view, the beams 18 and 20 together have approximately the shape of a right-angle triangle.

A rearwardly inclined support 21 projects upwardly from an approximately central region of the portion 19 of the beam 18, a strengthening beam 22 being provided between the support 21 and the connecting beam 20. The upper and rearmost end of the support 21 carries a fork 22A between the limbs of which a block 24 is turnably mounted with the aid of at least one substantially horizontal pivot pin 23. The block 24 has a hole extending through it in a direction perpendicular to the pin(s) 23 and an end portion of a rod 25 is entered through this hole. A stop 36 is mounted on the rod 25 forwardly from the block 24 and a helical compression spring 27 which surrounds said rod bears between the leading side of the block 24 and the stop 36. In a similar manner, a second helical compression spring 27 is wound around the rod 25 so as to bear between the rearmost side of the block 24 and a pair of lock nuts 28 that are mounted on a screw-threaded extreme rear end portion of the rod 25 as to be adjustable axially of that portion. It will be apparent that adjustment of the lock nuts 28 axially of the rod 25 will either increase or decrease the degree of compression of the springs 27.

The aforementioned bevel pinions 7 at the upper ends of the two shafts 3 are in driven connection with two bevel pinions 30 that are rigidly mounted on a shaft 29 that extends longitudinally of the hollow interior of the main frame beam 2. The end of the shaft 29 which is closest to the beam 18 is journaled in a bearing 32 mounted in an end wall of the main frame beam 2. Said end of the shaft 29 is in driven connection with the power-takeoff shaft of an agricultural tractor 26 by way of a telescopic transmission shaft 34 having universal joints 33 and 35 at its opposite ends. Also V-belt driving means can be used, so that the mowing elements can be rotated on a high number of revolutions f.i. 2,000 r.p.m. As can be seen in the drawings, the portion 19 of the beam 18 carries two aligned horizontal pins 31 with the aid of which said beam is linked to the free ends of the lower lifting links of the three-point lifting device or hitch of the tractor 26. The rod 25 which has been described is substituted for the upper adjustable lifting link of said lifting device or hitch.

In the use of the mowing machine which has been described, it is semimounted at the rear of the tractor 26 with the aid of the lifting device of that tractor and is moved over the ground in the direction A. Upon rotation of the power-takeoff shaft of the tractor 26, the mowing elements which include the blades 5 are rotated in the relatively opposite directions that are indicated by the arrows B in FIG. 1 of the drawings. The crop cut by the blades 5 is thrown rearwardly between the two shafts 3 by said blades and by the resilient flaps 6 which flaps also assist in displacing stones or other hard objects which may be found in the crop. The vertical thickness of the swath of crop which is left lying on the ground by the mowing machine is determined principally by the setting of the screening baffle 9 about the axis afforded by the hinges 8. The particular link of the chain 10 which is engaged with a hook at the free end of the arm 11 determines the angular setting of the screening baffle 9 about the axis which has just been mentioned and this, as will be evident from FIG. 2 of the drawings, determines the vertical spacing between the ground surface and the rearmost substantially horizontally disposed portion of the baffle 9.

The leading one of the two ground wheels 13 which is located closely adjacent one of the rear driven ground wheels of the tractor 26 and which is in front of the mowing elements relative to the direction A affords an effective support of the mowing machine that does not ride over the crop which is about to be cut by the machine. Said ground wheel 13 is, in fact, located between the mowing elements and the closely adjacent rear driven ground wheel of the tractor 6 both when viewed in the direction A and when viewed in a horizontal direction perpendicular to the direction A. As the mowing machine passes over the ground, it is capable of turning relative to the tractor 26 about an axis which is afforded by the pins 31 and which extends horizontally perpendicular to the direction A. Such turning movements are resiliently opposed by one or other of the two helical compression springs 27. This arrangement enables the tractor and mowing machine combination to match undulations in the surface of the ground over which it is passing. Adjustment of the mechanism 14A which has been described tilts the substantially vertical axes of rotation (afforded by the shafts 3) of the two mowing elements slightly forwardly or rearwardly of the vertical and this enables the level of cut of the blades 5 to be raised or lowered as required.

A chain 37 interconnects the rearmost of the two arms 12 and the portion 17 of the beam 18 between the two hinge pins 16. This chain 37 prevents the main frame beam 2 and the parts which it carries from turning downwardly too far about the hinge pins 16 at times when the three-point lifting device or hitch of the tractor 26 is raised for maneuvering or transport of the mowing machine or for other purposes.

I claim:

1. A mowing machine for mowing grass and the like on a strip of land laterally of a tractor, said machine comprising a plurality of adjacent mowing elements rotatable about substantially vertical axes, said machine being pivotally connected to the tractor through a pivotal means, said pivotal means extending approximately at right angles to the direction of travel and said machine being located laterally of the tractor, said tractor having a three-point lifting device and said pivotal means being pivotally coupled with the lower two arms of said lifting device, the upper arm of said lifting device being connected to said pivotal means through resilient means which resists excessive turning movements of said mowing elements relative to said tractor.

2. The machine of claim 1, wherein said resilient means includes an inclined support one end of which is connected to a shaft, the other end of said inclined support being connected to a slidable block, said block being slideably fitted on a rod and spring means on said rod to bias said block in a neutral position.

3. A mowing machine as claimed in claim 1, wherein said machine comprises two mowing elements adapted to rotate about two substantially vertical shafts journaled in a frame beam extending transversely of the direction of travel, and said frame beam is supported by support means which extends in the direction of travel.

4. A mowing machine as claimed in claim 3, wherein said support means is located, at least in part, a given distance in front of the mowing circle defined by said rotatable mowing elements.

5. A mowing machine as claimed in claim 3, wherein support means is located at the side of said mowing elements, at least in part, a given distance behind said mowing elements.

6. A mowing machine as claimed in claim 3, wherein said support means is positioned between said mowing machine and the tractor.

7. A mowing machine as claimed in claim 6, wherein said support means is comprised by at least one ground wheel.

8. A mowing machine as claimed in claim 7, wherein the width of said ground wheel is about one-quarter of the width of a tractor rear wheel.

9. A mowing machine as claimed in claim 3, wherein said support means is adjustable to vary the height of said frame beam.

10. A mowing machine as claimed in claim 9, wherein the height of said frame beam is adjusted by means of a screw spindle.

11. A mowing machine as claimed in claim 3, wherein the pivotal movement of said machine about the pivotal means is limited by stops.

12. A mowing machine as claimed in claim 11, wherein said machine is pivotally connected to said pivotal means to pivot about an axis extending in the direction of travel.

13. A mowing machine as claimed in claim 3, wherein said machine is supported on ground wheels in tandem and the distance between the points of ground contact of said wheels is greater than half the length of said frame beam extending transversely of the direction of travel.

14. A mowing machine as claimed in claim 13, wherein the distance between the points of ground contact is at least equal to the distance between the points where said two vertical axes are journaled in said frame beam.

15. A mowing machine as claimed in claim 1, wherein said mowing elements are substantially flat on the outer peripheries of their bottom sides with spherical, downwardly projecting extensions at the centers thereof.

16. A mowing machine for mowing grass and the like comprising a frame for connection to three-point lifting device of a tractor and a plurality of adjacent mowing elements adapted to rotate about vertical axes supported on said frame laterally of the tractor, said mowing elements having bottoms which have flat, outer peripheries and spherical, downwardly projecting extensions at the centers thereof, ground wheels supporting said elements and said ground wheels being mounted in tandem between said mowing elements and the prime mover.

17. A mowing machine as claimed in claim 16, wherein the diameters of the spherical extensions are about one-third of the diameter of the circles traced by blades of said mowing elements.

18. A mowing machine as claimed in claim 17, wherein said blades of the mowing elements are located in a plane passing through the bottoms of the elements.

19. A mowing machine as claimed in claim 17, wherein said blades have substantially rectangular shapes.

20. A mowing machine as claimed in claim 16, wherein at the rear end of the mowing machine there is a screen extending rearwardly substantially throughout the width of the machine, the rear end of the screen being located at about the same level above the ground as the upper side of a conventional swath of mown crop.

21. A mowing machine for mowing grass and the like, comprising a frame for attachment to the three-point lifting device of a tractor and a plurality of adjacent mowing elements adapted to rotate about vertical axes supported side-by-side on said frame, a curved screen mounted adjacent said elements to extend rearwardly substantially throughout the width of said machine, the rear end of said screen being located approximately at the same level above the ground as the upper side of a conventional swath of mown crop.

22. A mowing machine as claimed in claim 21, wherein said machine has a frame beam located above said elements and said screen is fastened to said frame beam.

23. A mowing machine as claimed in claim 22 wherein the hindmost part of said screen extends substantially horizontally.

24. A mowing machine as claimed in claim 23, wherein the foremost part of said screen extends substantially in a horizontal direction.

25. A mowing machine as claimed in claim 22, wherein said screen extends from its fastening point on said frame beam over a given distance obliquely to the rear in a downward direction.

26. A mowing machine as claimed in claim 21, wherein said mowing elements rotate in opposite directions.

27. A mowing machine as claimed in claim 26, wherein blades of said rotatable mowing elements overlap each other.

28. A mowing machine as claimed in claim 27, wherein said machine is equipped with two rotatable mowing elements.

29. A mowing machine as claimed in claim 21, wherein the rotatable axes of said mowing elements are provided with flaps of flexible material.

30. A mowing machine for mowing grass and the like on a strip of land laterally of a tractor, said machine comprising a plurality of adjacent mowing elements rotatable about substantially vertical axes, said machine being pivotally connected to the tractor through a pivotal shaft, said shaft extending approximately at right angles to the direction of travel and said machine being located laterally of the tractor, said pivotal shaft having a lateral portion extending rearwardly and substantially in the direction of travel, said machine being pivotally connected to said portion, a drive shaft and transmission means connecting said drive shaft to said mowing elements, said drive shaft being connectable to the power-takeoff at the rear of the tractor.

31. A mowing machine for mowing grass and the like on a strip of land laterally of a tractor, said machine comprising a plurality of adjacent mowing elements rotatable about substantially vertical axes, said machine being pivotally connected to the tractor through a pivotal means, said pivotal means extending approximately at right angles to the direction of travel and said machine being located laterally of the tractor, said tractor having a three-point lifting device and said pivotal means being pivotally coupled with the lower two arms of said lifting device, said machine having ground-supporting means and said ground-supporting means being positioned adjacent said pivotal means.